United States Patent [19]

Crowley

[11] 3,775,237

[45] Nov. 27, 1973

[54] EMBOSSED PLASTIC SURFACE COVERING AND METHOD OF PREPARING SAME

[76] Inventor: Richard P. Crowley, 125 High St., Boston, Mass. 02110

[22] Filed: Apr. 24, 1972

[21] Appl. No.: 246,722

Related U.S. Application Data

[63] Continuation-in-part of Ser. No. 43,233, June 3, 1970, Pat. No. 3,671,283, and a continuation-in-part of Ser. No. 228,396, Feb. 22, 1972, Continuation of Ser. No. 28,052, April 13, 1970, abandoned, Continuation-in-part of Ser. No. 566,810, July 21, 1966, Pat. No. 3,519,527, which is a continuation-in-part of Ser. No. 541,100, April 8, 1966, Pat. No. 3,453,171.

[52] U.S. Cl.................. 161/116, 117/38, 161/119, 161/160
[51] Int. Cl........................... B32b 3/00, B32b 3/30
[58] Field of Search.................. 161/160, 119, 116; 117/38

[56] References Cited
UNITED STATES PATENTS
3,408,248  10/1968  Maass.................................. 161/160
3,574,659  4/1971  Kwart et al......................... 161/160

Primary Examiner—William J. Van Balen

[57] ABSTRACT

A chemically embossed vinyl-chloride resin sheet material is prepared by treating certain areas of the gelled surface of a vinyl-chloride plastisol containing a blowing agent with a liquid containing a carboxylated vinyl-chloride resin and a heat-reactive compound, such as an amide reactive with the carboxyl groups of the resin, and heating the treated gelled vinyl-chloride resin sheet material to a temperature sufficient to react the amide with the carboxylated vinyl-chloride resin to cross-link the resin, to decompose the blowing agent and to fuse the vinyl-chloride resin plastisol after expansion, whereby a chemically embossed product is produced due to inhibition of full expansion of the sheet material by the cross-linked carboxylated vinyl-chloride resin in the treated areas.

16 Claims, No Drawings

EMBOSSED PLASTIC SURFACE COVERING AND METHOD OF PREPARING SAME

REFERENCE TO PRIOR APPLICATIONS

This application is a continuation-in-part of U.S. patent application Ser. No. 43,233, filed June 3, 1970 (now U.S. Pat. No. 3,671,283), and U.S. Ser. No. 228,396, filed Feb. 22, 1972 (which application is a continuation of Ser. No. 28,052, filed Apr. 13, 1970 (now abandoned), both parent applications being continuations-in-part of Ser. No. 566,810, filed July 21, 1966 (now U.S. Pat. No. 3,519,527), which was a continuation-in-part of Ser. No. 541,100, filed Apr. 8, 1966 (now U.S. Pat. No. 3,453,171).

BACKGROUND OF THE INVENTION

There are a number of methods of imparting an embossed appearance to a cellular sheet, including both chemically and mechanically embossed techniques. Chemical embossing includes methods for raising or lowering the decomposition temperature of the blowing agent used, and methods for preferentially stiffening prior to expansion certain areas of the expandable resin sheet.

U.S. Pat. No. 3,365,353 incorporates a monomer into a vinyl-chloride plastisol which is subsequently formed into a gelled resin sheet. A liquid containing a peroxide catalyst is then applied in a predetermined pattern to one surface of the gelled sheet. The treated sheet is then heated to polymerize the monomer, to decompose the blowing agent and to fuse the cellular plasticized resin, thereby providing a chemically embossed product.

U.S. Pat. Nos. 3,293,094 and 3,293,108 provide a method of chemical embossing by alteration of the decomposition temperature of the chemical blowing agent in the treated areas by the use of certain compounds.

U.S. Pat. No. 3,453,171 provides a chemically embossed product by preventing the full expansion of a gas-expandable resin in certain treated areas by the use of a cross-linking agent for the resin which may be a peroxide or a beam of atomic or subatomic particles.

U.S. Pat. No. 3,458,337 provides a chemically embossed sheet by employing an agent which suppresses the catalytic action of an organozinc catalyst contained in the gas-expandable resin sheet.

U.S. Pat. No. 3,538,204 obtains a chemically embossed product by applying an acrylic monomer and a peroxide cross-linking agent for the monomer to a gelled surface of a gas-expandable vinyl-chloride resin in a printing ink composition, and, subsequently, heating the material to effect polymerization of the monomer in the treated areas.

SUMMARY OF THE INVENTION

My invention concerns an improved method of preparing chemically embossed cellular sheet products, such as floor tile, and to the products so produced. In particular, my invention relates to a method of preparing a chemically embossed cellular vinyl-chloride resin floor tile by applying to the gelled surface of the gas-expandable vinyl-chloride resin a cross-linkable vinyl-chloride resin and a heat-reactive product which reacts with the cross-linkable resin, thereby, on heating and cross-linking of the resin, producing a chemically embossed product.

My method comprises: applying to the surface of a gas-expandable thermoplastic resin a polymer containing, for example, interpolymerized or pendant reactive groups in the polymer, and a compound which reacts with the polymer groups to cross-link the polymer; and heating the treated thermoplastic resin to cross-link the polymer through such reaction, thereby providing a chemically embossed product through preventing full expansion of the resin in the treated areas.

In particular, my method comprises: casting a vinyl-chloride resin plastisol containing a blowing agent into a thin layer; heating the cast plastisol layer to a temperature sufficient to form a gelled layer, but insufficient to decompose the blowing agent; applying to the gelled plastisol surface a liquid containing a cross-linkable vinyl-chloride resin, such as a vinyl-chloride resin containing hydroxyl, carboxyl or amide groups, and a heat-reactive amide or other compounds to react with the reactive groups of the resin; permitting the liquid to penetrate the gelled layer to the desired depth; and heating the treated gelled resin layer to a temperature to provide for cross-linking of the resin groups with the heat-reactive compound to harden the treated areas, to decompose the blowing agent and to fuse the resulting cellular vinyl-chloride resin, thereby providing a cellular product having chemically embossed areas where full expansion of the resin is prevented in the treated areas.

In the method described, typically azodicarbonamide is commonly employed as a blowing agent; however, as will be recognized by those skilled in the art, a variety of blowing or expanding agents, liquid and solid, alone or in combination, may be employed to provide the gas-expandable sheet material. Further, the temperatures employed to obtain a gelled vinyl-chloride resin layer are, for example, about 100° to 160° C; e.g., 120° to 140° C, while decomposition of the blowing agent and fusion of the vinyl-chloride resin is often accomplished at temperatures ranging from about 160° to 230° C; e.g., 170° to 190° C. My method may be adopted for the production of laminate-type sheet materials, such as cellular floor tiles, wherein a gas-expandable thermoplastic resin layer is cast or laminated onto a supporting sheet material, such as a woven or nonwoven fibrous or nonfibrous scrim or base sheet; for example, a resin-reinforced asbestos sheet or glass fiber, etc.. Optionally, a transparent wear-resistant thin resin top layer may be applied, either before or after expansion, but preferably, before expansion. My method will be described in particular in connection with the production of a floor tile product; however, it may be usefully employed to produce a variety of chemically embossed cellular products to include wall or upholstery covers, garments, boots, shoes, handbags and other cellular materials in which a chemically embossed design is desired.

The thermoplastic resin suitable for use in my invention includes, but is not limited to, those gas-expandable organic thermoplastic resinous materials, such as those polymers and copolymers of vinyl resins like vinyl-chloride resins to include polyvinyl chloride and copolymers of vinyl chloride with short-chain fatty acids of vinyl esters, such as vinyl acetate or vinylidene chloride, vinylbutyrate and such materials as well as olefinic resins, such as $C_2$–$C_4$ olefinic resins of polypropylene, polyethylene, ethylene-propylene copolymers and terpolymers and other thermoplastic materials.

The thermoplastic resins may be suitably plasticized, such as by the use of ester-type plasticizers like adipates, sebacates, phthalates, etc., and may contain those other additives normally employed, such as metal salt stabilizers, fillers, pigments, dyes, solvents, secondary plasticizers, viscosity-control additives, thickeners, glycols, cell-control agents and the like. The selection of the blowing agent to be employed depends upon the melt viscosity index and other properties of the polymer and the formulation, which blowing agents and their selections are well known.

The reactive polymers useful in my method may be selected to be compatible or imcompatible with the thermoplastic resin surface to be treated. Often, it is preferred that a similar polymer be employed for the purposes of compatability, such as, for example, employing a carboxylated vinyl-chloride resin as the reactive polymer with a gelled vinyl-chloride resin, while the employment of incompatible polymers may be used where distinct design effects are desired. The amount and type of reactive polymer and the heat-reactive polymer to cross-link the reactive groups of the polymers may be varied as desired. Depending upon the degree of chemical embossing desired; that is, upon the degree of hardness or stiffness in the treated areas, the reactive polymer may be fully or partially cross-linked, such as, for example, by varying the amount and nature of the heat-reactive cross-linking material.

The reactive polymer and the heat-reactive compound are typically applied to the treated area as a part of a liquid, either in a plastisol, organosol, or in a solvent solution, or in such form as to permit the liquid or polymer and reactive compound to penetrate into the gas-expandable thermoplastic resin. Often, both the reactive polymer and heat-reactive compound are incorporated into a printing ink composition so that the surface of the gas-expandable resin sheet material may be printed with the desired design effect, and treated in the same step. Such printing-ink composition may contain solvents, such as volatile organic solvents, as well as diluents, pigments, dyes, stabilizers, plasticizers and other additives. Organic solvent or plasticizer liquid compositions are preferred in order to permit rapid penetration of the gas-expandable resin sheet material in the treated areas. Typical organic solvents which may be employed would include, but not be limited to: hydrocarbon, such as tetrahydrofurane, benzene, xylene, toluene, cyclohexanone, heptane, as well as ketones, aldehydes, esters and alcohols, such as acetone, methylethyl ketone, ethanol, isopropanol, methyl isobutyl ketone, and other such volatile solvents commonly employed in solvent-printing inks, as well as liquid plasticizers. Variation in the degree of penetration of the liquid composition may be accomplished by varying the type and amount of solvent or liquid employed, as well as the time of penetration. In a production process, a more powerful solvent and penetration action is often desired in order to reduce the time of penetration, say, for example, from 1 to 10 minutes, while if time permits aging of the gas-expandable sheet after treatment in certain instances, 30 minutes to 12 hours often provides deeper embossing effects.

In the preferred method of treating the gas-expandable thermoplastic resin surface, both the reactive polymer and the heat-reactive compound are applied to the surface in the same liquid composition. However, the reactive polymer may be included in the gas-expandable thermoplastic resin sheet material, and for example, may comprise all or part of such sheet material, or the heat-reactive compound likewise be incorporated, say, as an additive to the gas-expandable thermoplastic resin sheet material. However, these non-preferred techniques are wasteful of the more expensive reactive polymer and heat-reactive material.

In my method, the reactive polymer and the reactive material should not react at room temperature or a temperature at which the material or the compositions may be stored, but should be reactive at above, for example, 50° C, or even 100° C, in order to prevent premature cross-linking of the polymer. Typically, reaction should occur below, at or simultaneously with the gas-expansion of the resin sheet material treated. It is preferred that the reaction occur prior to any substantial gas-expansion of the treated sheet material. For example, with a vinyl-chloride resin sheet material containing azodicarbonamide as the blowing agent, the cross-linking reaction should occur below 140° C, typically from 90° to 130° C.

The reactive polymers employed in the practice of my invention are well known, and may be those polymers which contain reactive groups (e.g., interpolymerized or pendant) capable of reacting with a heat-reactive compound to cross-link the polymer, and to provide for an increase in molecular weight and/or melt viscosity of the resulting cross-linked polymer. My reactive polymers do not include monomers which are subject to polymerization through the use of peroxide cross-linking agents, and the polymerization reaction of the monomers through their unsaturated linkages or in block fashion, through the use of heat-reactive compounds which induce cross-linking between reactive groups of the respective polymers and the cross-linking compound. Typical polymer-functional groups which serve as reactive groups would include, but not be limited to, hydroxyl, carboxyl, sulfonyl and amide groups. The employment of a cross-linked reactive polymer provides for improved chemical embossing with lower amounts of polymers over the use of monomers which are polymerized through peroxide-type catalysts, since cross-linking of polymers provides for a more rapid increase in molecular weight and melt viscosity in the treated areas than the polymerization of monomers, particularly where the monomers are of low molecular weight and applied in small amounts.

Some examples of reactive polymers containing a hydroxyl functional group would include: copolymers of hydroxyalkylmethacrylate, such as ethyl and propyl hydroxymethacrylate, and methylol acrylamides, such as N-methylol acrylamide; alkyl resins, polymerized epoxides; polyvinyl alcohol and alkylated polyvinyl alcohol; acrylated cellulose derivatives and the like. Typical examples of reactive polymers containing a carboxyl reactive group would include: copolymers of acrylic or methacrylic acid; alkyl resins; carboxylated cellulose derivatives; and carboxylated vinyl halide resins. The carboxyl groups may be present in a free-acid form or also may be present as an amine, ammonium or other salt form wherein free carboxyl is regenerated when the salt is heated. Typical examples of amide groups in reactive polymers would include: copolymers of acrylamide or methacrylamide; reactive polymers composed of acrylic, vinyl halide or copolymerized acrylic vinyl halide monomers, such as hydroxyalkylmethacrylate-vinyl chloride, acrylamide or methacrylamide-vinyl chloride, and/or copolymers of acrylic or methacrylic acids with vinyl halides. Reactive vinyl halide resins are the preferred reactive polymers for employment in my invention.

Typical reactive vinyl-halide resins include the homo and copolymer resins, such as vinyl chloride and copolymers with short-chain unsaturated fatty acids like vinyl acetate, as well as polyvinyl chloride. Carboxylated vinyl-halide resins may be prepared by interpolymerizing with or reacting the monomer in the presence of or blending with an unsaturated sulfonic or carboxylic acid. Typical acids which may be employed would include short-chain unsaturated carboxylic acids, such as alpha-beta $C_2-C_6$ unsaturated aliphatic mono or di carboxylic acids, like acrylic acid, methacrylic acid, itaconic acid, fumaric acid, maleic acid, and their salts, including the amine and ammonium salts and anhydrides where applicable. A reactive polymer, for example, vinyl-chloride resin, may contain from about 0.5 to 25 parts per hundred parts of the resin (phr) of the reactive groups; e.g., the unsaturated carboxylic acid; for example, from 1 to 10 parts. The carboxylic acids employed may include the higher molecular disperson-type resins so that the particles may be dispersed in a plasticizer or in a combination of primary and secondary plasticizers in a plastisol or in an organosol.

The preferred reactive vinyl-halide resins of my invention include the carboxylated vinyl-chloride resins or the amine or ammonium salts of such resins. Reactive polymers containing hydroxyl, carboxylic and amide-reactive groups may be reacted with a heat-reactive cross-linking compound, such as an amide; for example, with a heat-reactive compound, such as a melamine resin, like a butylated melamine-formaldehyde resin or hexamethoxymethylmelamine. An acid catalyst is usually required for the reaction of the hydroxyl and amide groups, while typically the carboxylic groups of the carboxylated resins are sufficiently acidic to provide self-catalysis; although, of course, additional acid catalyst may be used to further accelerate the cross-linking where desired.

A variety of heat-reactive compounds to cross-link the reactive polymers may be employed in connection with my method, which heat-reactive compounds are well known. Such heat-reactive compounds would include, but not be limited to: amino resins, such as melamine-formaldehyde and urea-formaldehyde resins, phenol-formaldehyde resins, as well as epoxy compounds and polyisocyanates, such as diisocyanate and isocyanate amides. Specific amide compounds would include hexamethoxymethylmelamine, dicyandiamide, butylated melamine-formaldehyde resins and similar compounds. These latter amide compounds react while at elevated temperatures while maintaining good storage stability in the presence of the reactive polymer at room temperature. More particularly, carboxylated vinyl-chloride resins may be cross-linked with urea-formaldehyde esters, diepoxides, trimethylolphenol, tris 1-2 methylazirdinylphosphazene oxide, and so forth, while hydroxylated vinyl-chloride resins may be cross-linked with urea-formaldehyde esters, toluene diisocyanate and the like.

The amounts of heat-reactive cross-linking compounds to be employed depend upon the number of reactive groups and the degree of cross-linking desired, but typically, may range from about 0.1 to 15 parts per hundred parts of the reactive resin; for example, 0.5 to 5.0 parts. The degree of cross-linking should be balanced between the desired melt resistance and thermoplasticity required. All of the cross-linking of the reactive polymer need not occur prior to the decomposition of the blowing agent, and, in fact, often residual cross-linking effects will occur on heating to the fusing temperature and on aging at a higher temperature. Where a reactive compound, such as a carboxylated vinyl-chloride resin, is employed in a liquid composition, such as a printing ink, amounts of the high molecular weight disperson reactive resin often range from 10 to 50% by weight of the composition.

DESCRIPTION OF THE PREFERRED EMBODIMENTS

For the purposes of illustration only, my method will be described in connection with the chemical embossing of a vinyl-chloride resin sheet material.

EXAMPLE 1

The gas-expandable thermoplastic resin formulation and the transparent formulation employed are as follows:

Base Coat Formulation

| Base Coat Ingredients | Parts by Weight |
|---|---|
| Copolymer vinyl chloride-vinyl acetate (12%) | 50 |
| Polyvinyl-chloride resin | 50 |
| Dioctylphthalate | 30 |
| Epoxidized soybean oil | 5 |
| Titanium dioxide pigment | 5 |
| Cadmium-zinc long-chain fatty soap stabilizer | 4 |
| Azodicarbonamide blowing agent | 4 |

Top Coat Formulation

| | |
|---|---|
| Polyvinyl-chloride resin | 80 |
| Dioctylphthalate | 20 |
| Dibutylphthalate | 5 |
| Barium Cadmium Organic soap stabilizer | 3 |
| Mineral Spirits | 15 |

A solvent-type printing ink composition containing a mixture of a vinyl-chloride resin and a carboxylated modified vinyl-chloride resin is employed in a liquid formulation as follows:

| | |
|---|---|
| 1. Vinyl chloride-vinyl acetate (9–10%) copolymer dispersion low fusion resin | 100 |
| *2. Disperson grade carboxyl modified dispersion resin; e.g., vinyl chloride-vinyl acetate copolymer resin containing reactive unsaturated carboxylic acid groups (GEON 130 × 17 — a Trademark of B.F. Goodrich Chemical Company) | 100 |
| 3. Plasticizer primary — cresyldiphenyl phosphate | 200 |
| 4. Plasticizer secondary — epoxidized soybean oil | 10 |
| 5. Pigment — Antimony Trioxide (71.4% in dioctyl phthalate | 6 |
| 6. Stabilizer — Barium-cadmium fatty acid soap | 6 |
| 7. Cross-linking carboxylic reactive compound — Dicyandiamide (67.5% pulverized grade dispersion in dioctyl phthalate) | 10 |
| 8. Methylethyl ketone | 20 |
| 9. Dioxane | 25 |
| 10. Pigment and filler as required | 0.5 to 100 |

* Average carboxyl content 1.67 grams per 100 grams of resin

The base coat plastisol is cast into a supporting sheet material, such as resin-reinforced asbestos sheet material or a glass fiber scrim material, in a thin wet film layer of about 10 to 50 mils, and then heated to a temperature sufficient to gel the plastisol without decomposition of the blowing agent; for example, 100° to 135° C for 3 to 15 minutes. The above printing ink composition is then applied in a predetermined pattern, such as by the employment of a design-embossed or engraved printing roll, to the top surface of the gelled base plastisol. The liquid is allowed to penetrate into the gelled surface for approximately 1 to 5 minutes. The treated sheet is then heated to a temperature of 120° to 140° C for 1 to 15 minutes to effect the cross-linking of the carboxylated resin with the amide in the treated areas. The top coat plastisol is then cast in a thin wet layer from about 1 to 10 mils onto the treated gelled surface. The top coat formulation represents on fusing a transparent wear-resistant layer. If desired, the top coat formulation may be cast after treating the surface and the cross-linking of the carboxylated resin and gelling and fusing of the top coat carried out in one step. The sheet material is then heated in a hot-air oven which may contain infrared heaters to a temperature of 170° to 200° C for 3 to 15 minutes. On such heating, the carboxylated resin may be further cross-linked, the blowing agent is decomposed, expanding the base plastisol to a cellular layer, and providing for the fusion of the cellular layer so formed. Due to the cross-linking of the carboxylated resin in the treated areas, this area resists full expansion; that is, represents the depressed areas of the sheet, which results in a chemically embossed floor tile product.

EXAMPLE 2

The foregoing example for preparing a chemically embossed floor tile is repeated, except that the following plastisol liquid printing ink composition is employed in place of the composition of Example 1:

| | |
|---|---|
| 1. Vinyl chloride maleic ester copolymer resin (PLIOVIC MC-85 — a Trademark of the Goodyear Tire and Rubber Co.) | 75.00 |
| 2. Plasticizer — cresyldiphenyl phosphate | 25.00 |
| 3. Plasticizer — chlorinated paraffin (43-45% chlorine) | 15.00 |
| 4. Plasticizer — Dioctyl phthalate | 26.7 |
| 5. Stabilizer — Barium-cadmium organic acid salt | 1.67 |
| 6. Pigment — Antimony trioxide | 3.00 |
| 7. Hexamethoxymethylmelamine (Cymel 301 — American Cyanamide Company) | 3.00 |

EXAMPLE 3

Example 1 is repeated employing in place of the carboxylated vinyl resins of Examples 1 and 2 a carboxylated vinyl-chloride resin composed of 83% vinyl chloride, 16% vinyl acetate and about 1% maleic acid (VMCC - Union Carbide Corporation). The heat-reactive compound employed is a butylated melamine-formaldehyde resin in an amount of about 3 parts per hundred parts of the reactive resin.

EXAMPLE 4

The chemically embossing technique previously described is repeated employing an interpolymerized vinyl-acrylic copolymer resin, which resin is chemically reactive to provide a cross-linked chemically bonded resin structure. In this embodiment, the vinyl-acrylic carboxylated resin is incorporated with a minor amount of a less expensive vinyl-chloride resin. Cross-linking of the vinyl-acrylic resin is accomplished by a melamine-formaldehyde cross-linkable resin which reacts on heating to induce cross-linking of the reactive resin.

EXAMPLE 5

Example 1 is repeated employing as the reactive resin an epoxy resin produced by the reaction of bisphenol A and epichlorhydrin. A heat-reactive compound is used in the presence of an acid catalyst employing a formulation such as the following:

| | |
|---|---|
| Epon 1007 resin (an epoxy resin which is a product of Shell Chemical Company) | 25.0 |
| Ethylene glycol ethylether acetate | 11.0 |
| Silicone resin (cell control agent) | 0.3 |
| Catalyst 1010 (an acid catalyst of American Cyanamide Company) | 0.3 |
| Methyl-isobutyl ketones | 18.0 |
| Toluene | 8.0 |
| Pigment titanium dioxide | 25.0 |
| Cymel 301 hexamethoxymethylmelamine | 5.0 |
| Toluene | 15.0 |

The above liquid formulation cross-links the epoxy resins in about 10 to 20 at 375° to 390° F.

The above formulation employs an acid catalyst which is typically employed in an amount of about 0.05 to 2.0 phr; e.g., 0.1 to 1.0 by weight based on total solids, which catalyst may comprise, for example, paratoluene sulfonic acid or an amine or ammonium or other salt thereof, which salt dissociates at the cross-linking temperatures to liberate free acid.

EXAMPLE 6

Example 1 is repeated employing a hydroxyl reactive acrylic resin employing a paratoluene sulfonic acid as an acid catalyst and butylated benzoguanamine as the heat-reactive compound or a butylated melamine-formaldehyde resin.

EXAMPLE 7

Example 1 is repeated employing as the reactive polymer a solvent-soluble acrylic copolymer or tripolymer comprising methacrylate, ethyl acrylate and an acrylic acid with a hexamethoxymethylmelamine as the heat-reactive compound.

EXAMPLE 8

A carboxylic acrylic resin is employed as the reactive compound, which resin comprises a copolymer of an unsaturated monocarboxylic acid and the alkyl esters of such acid, such as, for example, acrylic acid and butyl acrylate, which reactive polymer is cross-linked employing a small amount of paratoluene sulfonic acid as an acid catalyst, and hexamethoxymethylmelamine as the heat-reactive compound.

EXAMPLE 9

A reactive polymer is employed in the liquid-carrier formulation which comprises an alkyl resin which is produced from a combination of phthalic anhydride or trimellitic anhydride, adipic and various polyols with fatty acids as an optional feature. These reactive alkyl resins may be cross-linked by hexamethoxymethylmelamine.

EXAMPLE 10

Example 1 is repeated employing polyvinyl esters and acetyls; for example, partially hydrolized polyvinyl acetate, in the presence of low concentration of hydrochloric or sulfuric acid with hexamethoxymethylmelamine employed as the heat-reactive compound provides a cross-linked vinyl acetate.

EXAMPLE 11

Vinyl acetate-chloride copolymers, such as, for example, vinyl DHEH (a product of Union Carbide Corporation) and 50% dialkyl phthalate as the plasticizer may be employed as a liquid-carrier composition to treat certain areas in the presence of 1 phr of acid catalyst 1010 and about 5 parts of Cymel 301, which composition when heated for 10 to 20 minutes at 375° F cross-links the resin.

EXAMPLE 12

The chemically embossing technique of Example 1 is repeated, except that the carboxylated vinyl-chloride resin is employed in an amount of from about 10 to 35% in the base formula plastisol, and no carboxylated resin is employed in the liquid-carrier composition, although the liquid-carrier composition comprises the heat-reactive compound, thereby producing a chemically embossed product in the treated areas, while the carboxylated vinyl-chloride resin in the untreated areas remains unchanged.

My invention has been described employing various illustrative reactive polymers and heat-reactive compounds to cross-link the polymers; however, it is apparent to a person skilled in the art that various modifications, additions and changes to such formulations and techniques may be made, all within the spirit of the scope of my invention.

What I claim is:

1. A method of preparing a cellular thermoplastic resin material having an embossed effect on the surface, which method comprises:
   a. applying to selected areas of a gas-expandable thermoplastic resinous material a polymer containing reactive groups consisting of hydroxyl, carboxyl or amide groups, and a heat-reactive compound which will react and cross-link with said reactive groups of the polymer to reduce the thermoplastic properties of the resinous material in the selected areas; and
   b. heating the resinous material to effect the cross-linking of the polymer and to expand the resinous material, whereby full expansion of the resinous material in the selected areas is inhibited by the cross-linked polymer.

2. The method of claim 1 wherein the reactive polymer is a vinyl-chloride resin or acrylic resin, an alkyl resin or vinyl-acrylic resin, or an epoxy resin.

3. The method of claim 1 wherein the heat-reactive compound is an amide.

4. The method of claim 3 wherein the heat-reactive compound is an amide selected from the group consisting of melamine-formaldehyde resin, dicyanamide or hexamethoxymethylmelamine.

5. The method of claim 1 wherein the thermoplastic resinous material is a plasticized vinyl-chloride resin which contains a chemical blowing agent therein.

6. The method of claim 1 wherein the heat-reactive compound is present in an amount of from about 0.1 to 15 phr of the polymer, and the polymer contains from about 0.5 to 25 phr of the reactive groups.

7. The method of claim 1 which includes applying the polymer and heat-reactive compound to the selected areas in a liquid printing composition.

8. The method of claim 1 wherein cross-linking of the heat-reactive compound and the polymer occurs at a temperature of from 50° to 140° C.

9. The method of claim 1 which includes cross-linking the polymer with the heat-reactive compound in the presence of an acid catalyst in an amount of from about 0.05 to 2.0 phr.

10. The cellular chemically embossed product produced by the method of claim 1.

11. A method of preparing a cellular embossed thermoplastic resin, which method comprises:
   a. applying to a selected area of a gas-expandable gelled vinyl-chloride resin sheet material a vinyl-chloride polymer containing reactive hydroxyl, carboxyl or amide groups, and a heat-reactive amide compound which will react with the groups to cross-link the polymer, and to reduce the thermoplasticity of the gas-expandable vinyl-chloride resin in the selected areas; and
   b. heating the gas-expandable vinyl-chloride resin to a temperature to effect the cross-linking of the vinyl-chloride polymer, the decomposing of the blowing agent and the fusing of the expanded vinyl-chloride resin, thereby producing a chemically embossed cellular product.

12. The method of claim 11 which includes applying the polymer and the heat-reactive amide cross-linking compound in a liquid plastisol composition to the surface of the gelled gas-expandable thermoplastic resin material.

13. The method of claim 11 which includes incorporating the polymer in the gas-expandable thermoplastic resin material and treating selected areas with the heat-reactive amide compound.

14. The method of claim 11 which includes incorporating in the gas-expandable thermoplastic resin material a cross-linking amount of the heat-reactive amide compound, and applying the polymer to selected areas of the gas-expandable material.

15. The method of claim 11 which includes the step of applying a thin layer of a transparent vinyl-chloride resin plastisol onto the surface of the treated vinyl-chloride resin prior to expansion, whereby on subsequent heating, the transparent vinyl-chloride resin will fuse to form a wear-resistant transparent top surface layer.

16. The chemically embossed product produced by the method of claim 11.

* * * * *